Patented Sept. 2, 1941

2,254,433

UNITED STATES PATENT OFFICE 2,254,433

LUBRICATING OIL

Eugene Lieber, Linden, N. J., assignor to Standard Oil Development Company, a corporation of Delaware No Drawing. Application September 9, 1938, Serial No. 229,123

5 Claims. (Cl. 252—57)

The present invention relates to improved lubricating oils and especially to oils of low pour point produced by the addition of a new type of pour point depressant to waxy lubricating oils. The invention will be fully understood from the following description.

It has been found that certain polyesters are valuable wax modifying agents. These esters are produced by the reaction of long chain polyhydric alcohols with polycarboxylic acids. Of this broader class the preferred compounds are prepared from dihydric alcohols having at least 10 carbon atoms, preferably in straight chain, and from dicarboxylic acids or from anhydrides which may be used interchangeably with the acids.

Of the various alcohols the most readily available is 1-9 dihydroxy octadecane which is commercially prepared by the exhaustive hydrogenation of castor oil or of ricinoleic acid, but it will be understood that other similar dihydroxy alcohols, such as the reduction products of high molecular weight dicarboxylic aliphatic acids can be used.

The acids employed may be either aliphatic or cyclic. As examples of such acids may be mentioned oxalic, succinic, adipic, suberic, phthalic, iso- and terephthalic and the like.

While the structure of the compounds is not fully known, it is believed that they are polyesters of the following formula:

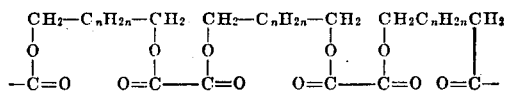

In this formula, the ester is prepared from an oxalic acid for simplicity but it will be remembered that other acids as stated above can be used equally well. Furthermore, for the same reason the alkyl groups are represented as corresponding to alcohols having hydroxyl groups on the end carbon atoms of the chain but, as stated before, this also is not necessary.

The polyesters are prepared by any of the well known methods of esterification, but it has been found most desirable to admix the said alcohol and acid reactants in the desired proportions and then to heat the mixture for several hours at an elevated temperature. During the reaction period, the mixture is agitated and provision is preferably made to gradually remove the water produced by esterification. If desired, acid anhydride or chloride may be employed instead of the acid itself. The temperature of the reaction is preferably between about 400 and 450° F. and a time of 2½ to 10 hours appears to be satisfactory for the reaction. The proportion of acid and alcohol appear to considerably affect the pour depressing quality of the product. This ratio may be varied considerably with different materials, but in general it is preferred that the molecular ratio of alcohol to acid be near the ratio of 1 to 1, although good results are obtained in a range from ½:1 up to about 2:1.

The products obtained by the above methods are waxy solid substances, light in color when they are carefully made. They are slightly tacky to the touch and have low melting points. They are freely soluble in mineral oils and are obtained in yields of 75 to 80% or better.

The amount of these materials used for pour depression varies from about ½ to 2%, but generally 1% is sufficient for good results. These substances are likewise useful as wax modifying agents for assisting in the separation of solid, waxy constituents from lubricating oils. The presence of as little as ½ to 1% of the material promotes rapid chilling of the diluted waxy oil and effects greater ease in separation by either sedimentation, centrifugation or filtration.

Example I

Various proportions of phthalic anhydride and octadecane diol (1-9 dihydroxy octa decane) are admixed and heated until completely molten. A stream of inert gas (nitrogen) is then passed through the liquid mixture for agitation and the temperature is raised to effect the reaction. The materials are then held at this point during the reaction period. After the reaction period, the product is cooled while still being agitated by the inert gas. The products are in each case yellow, wax-like solids of low melting point and are obtained in yields of 70 to 85%.

The pour depressing properties were determined by adding 1% of these materials to a waxy oil which had an original pour point of 30° F., and the pour point of the mixtures were then determined.

In the table below data is summarized including the weight of the two reactants, the temperature of reaction, time of reaction and the pour point of the waxy oil to which 1% of the particular depressant had been added.

| Octadecane diol | Phthalic anhydride | Temp. | Time | Pour point |
|---|---|---|---|---|
| Grams | Grams | °F. | Hours | °F. |
| 75 | 25 | 450 | 8 | (1%)+5 |
| 75 | 25 | 400 | 3 | +5 |
| 75 | 75 | 450 | 1 | −5 |
| 75 | 75 | 450 | 3 | −10 |
| 100 | 25 | 400 | 5 | +10 |
| 125 | 25 | 450 | 1 | +5 |
| 75 | 75 | 400 | 3 | −15 |
| 75 | 75 | 400 | 5 | −20 |

Example II

In the same manner as illustrated in Example I, a depressant was made using the octadecane diol and succinic acid. The proportion was 75 grams of the former to 75 grams of the latter. The temperature of reaction was 400° F. and the time of reaction 5 hours.

When 1% of the product was added to a waxy oil, having an original pour point of 30° F., it was reduced to +5° F.

*Example III*

A depressant was made according to Example II, except that adipic acid was used in place of succinic acid. 1% of the polyester so produced was added to a waxy oil having an original pour point of 30° F., and it was found to be reduced to +10° F.

The present invention is not to be limited by any theory of the mechanism of the reaction, nor the particular alcohols or acids employed, but only by the following claims in which it is desired to claim all novelty inherent in the invention.

I claim:

1. Lubricating oil of low pour cold test comprising a waxy mineral oil and 0.5% to 2% of a polyester of 1-9 dihydroxy octadecane and a dicarboxylic aromatic acid.

2. Lubricating oil of low pour cold test comprising a waxy mineral oil and 0.5% to 2% of a polyester of 1-9 dihydroxy octadecane and a phthalic acid.

3. Lubricating oil of low pour cold test comprising a waxy mineral oil and 0.5% to 2% of a polyester of 1-9 dihydroxy octadecane and phthalic anhydride.

4. Composition of matter comprising a waxy lubricating oil and a small amount, not greater than 2%, of a pour point depressing polyester formed from a polyhydroxy aliphatic alcohol with a long hydrocarbon chain and a polycarboxylic aromatic acid.

5. Composition of matter comprising a waxy lubricating oil and a small amount, not greater than 2%, of a pour point depressing polyester formed from a polyhydroxy aliphatic alcohol with a long hydrocarbon chain and a phthalic acid.

EUGENE LIEBER.